United States Patent [19]
Phillips

[11] 3,952,883
[45] Apr. 27, 1976

[54] AUTOMATIC MATERIAL FEEDING APPARATUS

[76] Inventor: Stewart A. Phillips, 1404 Continental Drive, Evansville, Ind. 47715

[22] Filed: Feb. 20, 1974

[21] Appl. No.: 444,105

[52] U.S. Cl. .................. 214/8.5 K; 214/8.5 F; 214/DIG. 10; 221/251
[51] Int. Cl.² ................................. B65G 59/06
[58] Field of Search .......... 214/8.5 F, 8.5 A, 8.5 K, 214/DIG. 10; 221/251, 270, 299, 293, 298, 297, 301

[56] References Cited
UNITED STATES PATENTS

| | | | |
|---|---|---|---|
| 1,888,386 | 11/1932 | Johnson et al. | 221/251 X |
| 2,699,862 | 1/1955 | Walter | 214/8.5 F X |
| 2,730,144 | 1/1956 | Joa | 214/8.5 K X |
| 3,400,858 | 9/1968 | Strohmeier et al. | 221/251 X |

FOREIGN PATENTS OR APPLICATIONS

| 1,220,772 | 7/1966 | Germany | 221/251 |
|---|---|---|---|

*Primary Examiner*—Frank E. Werner
*Attorney, Agent, or Firm*—Warren D. Flackbert

[57] ABSTRACT

An automatic material feeding arrangement having particular adaptability for moving, at a programmed rate, successive layers of vertically stacked lumber for further processing by selective indexing, including, in one example, hydraulic operative ejecting mechanisms cooperating with linkage systems.

6 Claims, 4 Drawing Figures

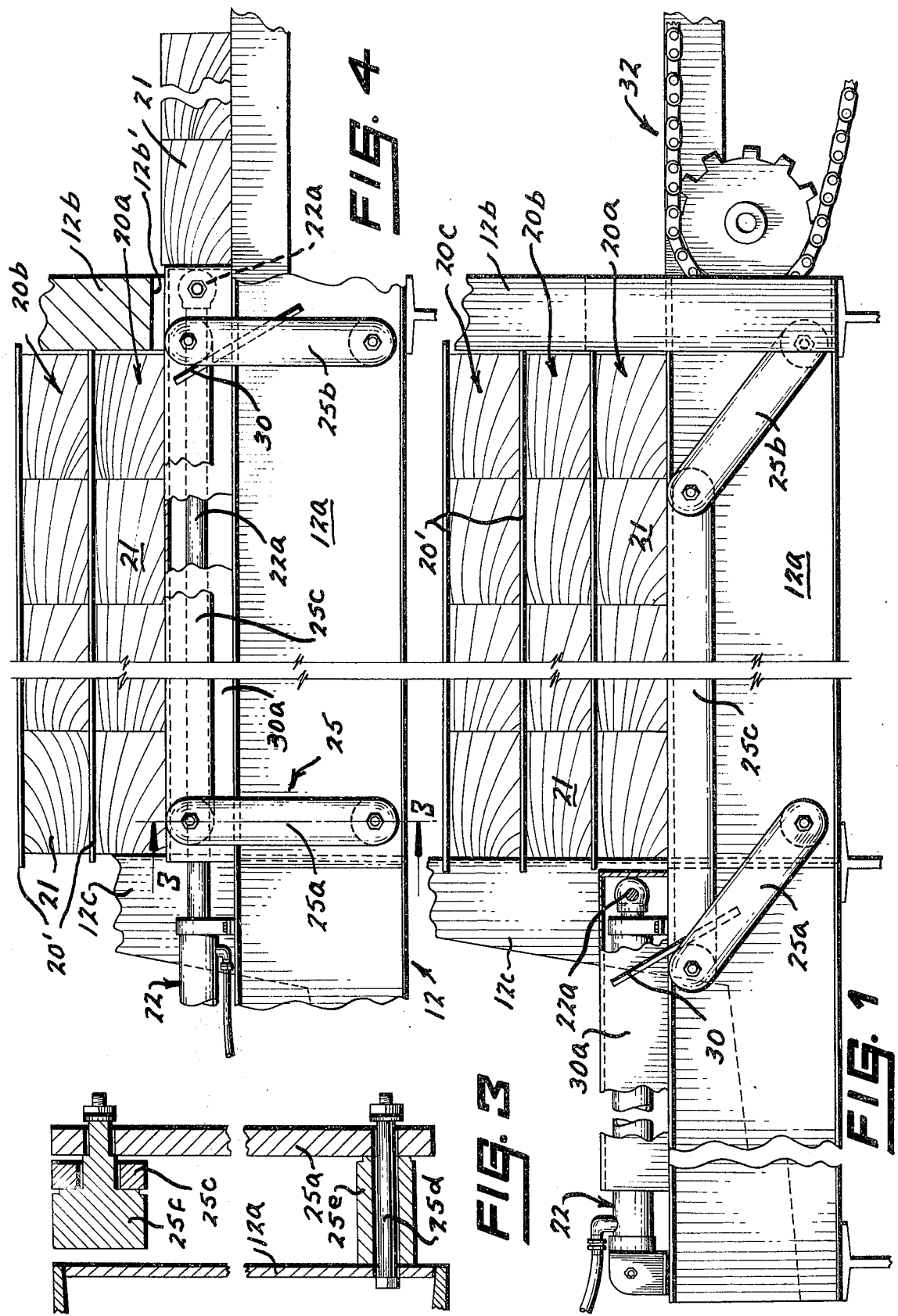

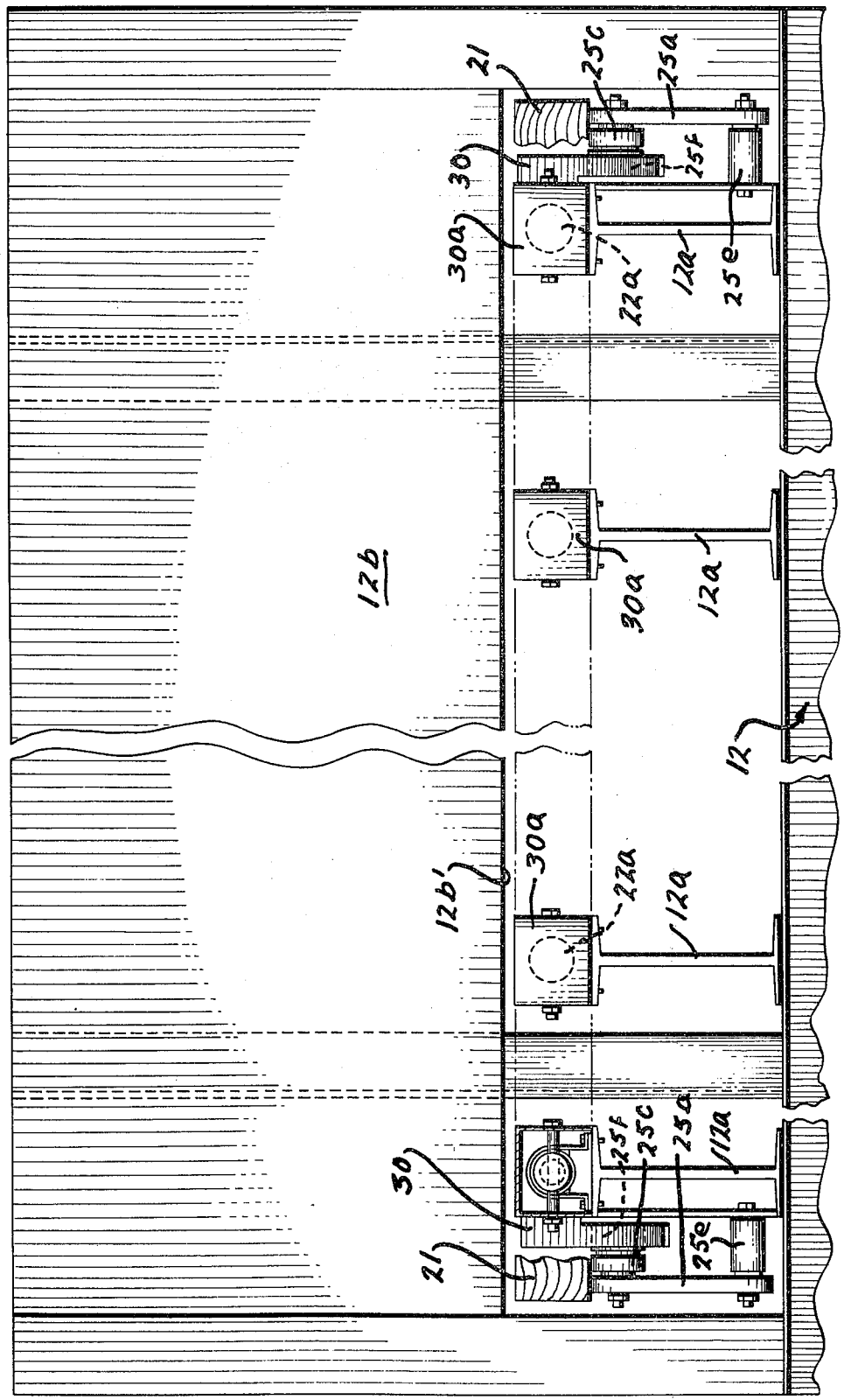

AUTOMATIC MATERIAL FEEDING APPARATUS

As is known, it is customary in the lumber industry to cut the sides from a log to reveal a center portion which is subsequently cut into rough boards, identified as cants, the latter being, for example, 5 to 6 inches in height, 8 to 16 feet in length, and of a random width. Previously, such cants were typically stacked in storage layers, by hand, and, thereafter, transported to a cutting or other finishing operation.

The preceding represented a time consuming approach, involving manpower and the associated expense therewith. The need, therefore, was apparent for mechanization to permit higher productionn and, of course, the saved labor for use elsewhere in the plant operation.

The invention satisfies such a requirement, being a structural arrangement onto which layers of cants are vertically stacked and, thereafter, fed or ejected from the machine automatically, at a desired rate and in a timed indexing, for subsequent processing. Briefly, the machine utilizes a power operated pusher or plunger assembly(s) to move successive layers of cants therefrom, where, typically, each of such layers are then dropped by gravity into a position for pushing, linkage arrangements maintaining the next succeeding upper layer in a raised position until ejection is desired.

The overall apparatus represents a positive approach to the automatic feeding of lumber or like material, using commonly available components which are readily assembled. As stated, not only is a more steady and desired rate of flow achieved, but the use of manpower is minimized in the feeding operation, permitting the availability of production workers at other work stations.

A better understanding of the present invention will become more apparent from the following description, taken in conjunction with the accompanying drawings, wherein FIG. 1 is a view in side elevation, partly fragmentary, showing a typical automatic feeding apparatus in accordance with the teachings of the present invention;

FIG. 2 is a view in end elevation, also partly fragmentary, generally looking from right to left in FIG. 1, with one of the linkages of the linkage assemblies removed for reasons of clarity, showing further details of the invention;

FIG. 3 is a view in vertical section, taken at line 3—3 of FIG. 4 and looking in the direction of the arrows, illustrating details of a portion of one of the aforesaid linkage assemblies used in the apparatus; and, FIG. 4 is another view in side elevation, also partly fragmentary, comparing to that of FIG. 1, but showing a linkage assembly at a position at an end of the ejecting or feeding stroke.

For the purposes of promoting an understanding of the principles of the invention, reference will now be made to the embodiment illustrated in the drawing and specific language will be used to describe the same. It will be nevertheless understood that no limitation of the scope of the invention is thereby intended, such alterations and further modifications of the illustrated device and such further applications of the principles of the invention as illustrated therein being contemplated as would normally occur to one skilled in the art to which the invention relates.

Referring now to the figures, the automatic material feeding apparatus of the invention is defined by a framework 12 having a series of generally horizontal and parallel spaced-apart support members 12a, typically I-beams, an upwardly extending front member 12b, i.e. positioned at the end of the apparatus in the direction of travel, and an upwardly extending rear member or backstop 12c, the front and rear members 12b and 12c serving to contain layers 20a, 20b, 20c and others (not shown) of cants 21 on the aforesaid support members 12a.

The meaning of a cant 21 has been stated hereabove, where, however, each layer 20a, 20b, 20c, and any succeeding layer thereof, are separated or divided by metal strips 20' (which also serve to prevent the catching of edges). While the widths of the individual cants 21 may bary, as well as the lengths, a requisite for proper operation of the apparatus is that the height of the individual boards or cants 21 making up each individual layer vary, constant. In any event, the aforenoted stacked layers of cants 21 are evident in FIGS. 1 and 4.

As further evident in FIGS. 1, 2 and 4, each support member 12a mounts an hydraulic or like pressure operated cylinder 22 having a slidable pusher, piston or rod 22a, the latter being movable from a non-ejecting to a fully ejected position, and conversely. The general structure and operation of the cylinder mechanisms is known in the art and require no further discussion at this time.

The outer surface of each of the support members 12a, by way of example, positions a linkage assembly 25 (evident in the figures), for reasons to become apparent from the following discussion. Each linkage assembly includes a first pivotal linkage 25a, a second pivotal linkage 25b movable in parallel relationship with the first pivotal linkage 25a, and a third linkage 25c interconnecting linkage 25a and 25b. A lower pivot point of linkage 25a and linkage 25b is on the support member or members 12a of the framework 12. Linkage 25b, nor its pivotal connection with linkage 25c, is not shown in FIG. 2 for reasons of clarity.

FIG. 3 illustrates certain details of the linkage arrangement, i.e. the linkage 25a pivotal on a shaft 25d extending from a support member 12a of the framework 12, being surrounded by a sleeve 25e; the linkage 25c interconnecting the linkage 25b; and, a roller bearing 25f mounted on linkage 25a, with the aforesaid linkage 25c therebetween.

The overall structure is completed by a rearwardly inclined member 30 disposed on an inverted channel 30a movable in grooves (not shown) with each pusher 22a, where such inclined member 30 travels between and into selective engagement with the roller bearing 25f, i.e. the roller bearing 25f moves upwardly and downwardly on a face of the inclined member 30, depending upon direction of movement of the pusher 22a.

Moreover, a conveyor 32 is provided to receive the successive layers of cants 21 and move such to another location for further processing.

It will be noted that the upwardly extending front member 12b has an opening or gate 12b' adjacent the base thereof, the latter being of such geometry in height as to allow the passage of the desired thickness of cants 21 therethrough, being, in some forms of the apparatus, vertically adjustable. In the alternative, spacers can be placed on the support members 12a to provide a gate 12b' of lesser height.

The opening or gate 12b' also permits passage of the linkage 25b to the position of FIG. 4, i.e. provides the required tolerance at the full vertical position of the linkage 25b. While not shown in the drawings, the linkage 25b could also be arranged to pivot on an extension of the support members 12a, i.e. forwardly of the upwardly extending front member 12b (in the direction of travel). In any event, linkages 25a and 25b, and 25c, would still retain a continual parallelogram type relationship. Moreover, the linkage assemblies 25 could be individually powered, i.e. from other than the cylinders 22 shown.

In use, when each cylinder 22 is actuated, the pistons or plungers 22a thereof move, feeding or ejecting the lower layer 20a of cants 21 from left to right in FIG. 1 and onto the conveyor 32, the channels 30a on plungers 22a holding the layers above thereon. At the end of such movement, and by reason of the simultaneous travel of inclined members 30 and the pushing thereof by the roller bearings 25f against linkages 25b, the next layer 20b of cants 21 above the ejected layer 20a is retained in the shown elevated position, such being because of linkages 25c and, as well, the strips 20' beneath each vertical layer of cants 21. When layer 20a of cants 21 moves from the apparatus, the linkage assemblies 25 ultimately assume the position of FIG. 4.

Upon withdrawal of the plungers or pushers 22a, the linkages 25c return to the position of FIG. 1, where the inclined members 30 bear against the roller bearings 25f of the linkages 25a, as the plungers move leftwardly. Thereafter, the second layer 20b of cants 21 moves, as by gravity, downwardly, to a position for subsequent ejection from the machine. In other words, the feeding is automatic, continuing as long as there is a supply of layered cants 21 at hand.

The apparatus and method herein typically includes a linkage arrangement 25 for each cylinder and plunger (where for clarity of presentation, only two of such are shown), depending upon required usage and material demensions. Alternatively, but also not shown, a conveyor belt could be secured to the front end of the plunger 22a, the sprockets thereof being synchronous with a drive shaft for the conveyor 32. Such added conveyor belt would serve in the ejecting of each layer of cants 21, being disposed beneath the lower or moving layer and on top of one or more support members 12a. In other words, layer movement can be achieved as shown, or by such alternative arrangement. Other approaches, of course, are feasible.

As should be apparent, the invention represents a highly versatile approach to the automatic feeding of material, such as cants of lumber, where indexing of successive layers is readily accomplished in combination with the feeding or ejecting action. While certain alternative structural adaptations have been mentioned, it should be understood that other changes or modifications may be made within the spirit of the invention. Thus, the preceding should be considered illustrative and not as limiting the scope of the following claims.

I claim:

1. Apparatus for automatically feeding a material comprising a framework including support members, multi-layers of material on said support members, means movable from a non-ejecting position to a position ejecting one of said layers of material from said apparatus, and means including a portion of a linkage assembly maintaining layers of material above said one of said layers after withdrawal of said ejecting means upon reaching an ejecting position to said non-ejecting position and permitting the dropping of the next succeeding layer of material into an ejecting position, said linkage assembly having a first movable component, a second movable component, a third movable component and a fourth stationary component in a parallelogram relationship, and where said second movable component is said portion of said maintaining means.

2. The apparatus of claim 1 where said ejecting means is a power operated cylinder.

3. The apparatus of claim 1 where said linkage assembly is controlled by a power operated cylinder.

4. The apparatus of claim 1 where said ejecting means is disposed on at least one of said support members.

5. The apparatus of claim 1 where said one of said layers is the lowest layer in said multi-layers of material.

6. The apparatus of claim 1 where said framework includes an upstanding member having an opening for passage of the ejected layer of material.

* * * * *